(12) United States Patent
Hayashi et al.

(10) Patent No.: US 7,588,111 B2
(45) Date of Patent: Sep. 15, 2009

(54) REAR SHOCK ABSORBER ARRANGEMENT STRUCTURE FOR MOTORCYCLE

(75) Inventors: Hideki Hayashi, Saitama (JP); Susumu Michisaka, Saitama (JP); Shohei Takiguchi, Saitama (JP); Yusuke Inoue, Saitama (JP); Yasuyuki Maeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 11/699,364

(22) Filed: Jan. 30, 2007

(65) Prior Publication Data

US 2007/0175690 A1    Aug. 2, 2007

(30) Foreign Application Priority Data

Jan. 31, 2006    (JP) ............................ 2006-022061

(51) Int. Cl.
    *B62M 7/00*    (2006.01)
(52) U.S. Cl. .................................... 180/227
(58) Field of Classification Search ................ 180/227, 180/219; 280/185, 286; 296/37.1; 224/413
See application file for complete search history.

(56) References Cited

U.S. PATENT DOCUMENTS 4,697,664 A * 10/1987 Kohyama ................... 180/226
5,433,286 A    7/1995 Kumamaru et al.
6,349,785 B1 * 2/2002 Ohmika et al. ............. 180/227
6,808,465 B2 * 10/2004 Kuga et al. ..................... 474/14
7,422,084 B2 * 9/2008 Mochizuki et al. .......... 180/227
2002/0027032 A1    3/2002 Tsutsumikoshi

FOREIGN PATENT DOCUMENTS

| EP | 0-303-408 A2 | 2/1989 |
| EP | 1-063-153 A | 12/2000 |
| EP | 1-747-983 A | 1/2007 |
| JP | 2003-182667 A | 7/2003 |

* cited by examiner

*Primary Examiner*—Tony H. Winner
(74) *Attorney, Agent, or Firm*—Birch, Stewart, Kolasch & Birch, LLP (57) ABSTRACT

To provide a rear shock absorber arrangement structure for a motorcycle having no limitation on the arrangement flexibility and shape of a storage chamber. In a rear shock absorber arrangement structure for a motorcycle, including a unit swing type power unit U swingably connected to a body frame F and rotatably supporting a rear wheel WR, a rear shock absorber suspends the power unit from the body frame F. A storage chamber is disposed above the rear wheel WR. A lower end of the rear shock absorber is brought into connection at a position lower than the wheel-axle O provided in the power unit U as viewed from the side of the vehicle. An upper end of the rear shock absorber is connected to a portion lower than the storage chamber and near a bottom portion of the storage chamber.

20 Claims, 6 Drawing Sheets

REAR SHOCK ABSORBER ARRANGEMENT STRUCTURE FOR MOTORCYCLE

CROSS-REFERENCE TO RELATED APPLICATIONS

The present application claims priority under 35 USC 119 to Japanese Patent Application No. 2006-022061 filed on Jan. 31, 2006 the entire contents of which are hereby incorporated by reference.

BACKGROUND OF THE INVENTION

1. Field of the Invention

The present invention relates to a rear shock absorber arrangement structure for a motorcycle.

2. Description of Background Art

Some motorcycles include a storage chamber above a rear wheel for storing a helmet or the like therein. In designing the shape and arrangement of such a storage chamber, the arrangement of a rear shock absorber connecting a body frame with a swing member supporting a rear wheel substantially limits the design. However, in recent years, there is an increased need for a storage chamber having a larger capacity. Studies have been made of arrangement of a rear shock absorber that have no influence on the storage chamber while ensuring the shape and capacity of the storage chamber. For instance, Japanese Patent Laid-open No. 2003-182667 teaches that the upper end of a rear shock absorber is located rearwardly of a storage chamber included in a body frame.

However, the conventional art mentioned above cannot expand the storage chamber in the vicinity of the upper end of the rear shock absorber. Thus, the arrangement flexibility and shape are limited, which poses a problem in that the storage chamber cannot ensure a sufficient capacity.

SUMMARY AND OBJECTS OF THE INVENTION

It is an object of an embodiment of the present invention, to provide a rear shock absorber arrangement structure for a motorcycle having no limitation on the arrangement flexibility and shape of a storage chamber.

An embodiment of the present invention provides in a rear shock absorber arrangement structure for a motorcycle, a swing member, such as a unit swing type power unit U, swingably connected to a body frame F and rotatably supporting a rear wheel WR. A rear shock absorber 37 adapted to cause the body frame to suspend the swing member and a storage chamber 46 disposed above the wheel. A lower end of the rear shock absorber is brought into connection at a position lower than a wheel-axle O provided in the swing member as viewed from the side of the vehicle. An upper end of the rear shock absorber is connected to a portion lower than the storage chamber and near a bottom portion of the storage chamber.

With such a configuration, the rear shock absorber can be lowered in an arrangement position, whereby it can be increased with respect to the arrangement flexibility without sacrificing the storage chamber.

An embodiment of the present invention provides a rear shock absorber arrangement structure for a motorcycle including a swing member swingably connected to a body frame and rotatably supporting a wheel with a rear shock absorber adapted to cause the body frame to suspend the swing member and a storage chamber disposed above the wheel. A hanging portion 35 is attached to a portion e.g., a seat rails 16, 16, that is part of the body frame and supports the storage chamber. The hanging portion is formed to extend downwardly and terminate at least near a bottom portion of the storage chamber. An upper end of the rear shock absorber is connected to the hanging portion at a position below the storage chamber.

With such a configuration, the rear shock absorber can be lowered in the arrangement position, whereby it can be increased with respect to the arrangement flexibility without sacrificing the storage chamber. In addition, the hanging portion can realize the optimum arrangement of the rear shock absorber without the influence caused by the shape of the frame or the like.

According to an embodiment of the present invention, a lower end of the rear shock absorber is connected to a portion of the swing member at a position rearwardly and downwardly of a wheel-axle.

With such a configuration, the rear shock absorber can ensure a long shock absorber stroke.

According to an embodiment of the present invention, the body frame includes a pair of left and right frames, which support the storage chamber, the hanging portion is attached to each of the left and right frames, and the hanging portions are connected by a cross member 39.

With such a configuration, the entire body frame can share and carry, via the hanging portion, an input load applied to the rear shock absorber.

According to an embodiment of the present invention, the cross member is located at a position corresponding to a rear end portion and a bottom portion of the storage chamber as viewed from the side of the vehicle.

With such a configuration, the attachment portion of the rear shock absorber can be reinforced without sacrificing the storage capacity of the storage chamber.

According to an embodiment of the present invention, the cross member is formed to be rearwardly concave as viewed from above the vehicle with a rear surface of the storage chamber being formed to extend along the cross member.

With such a configuration, it is possible to expand the rear portion of the storage chamber.

According to an embodiment of the present invention, the lowered arrangement position of the rear shock absorber can increase the arrangement flexibility of the rear shock absorber without sacrificing the storage chamber. This produces an effect wherein the storage chamber can be increased in capacity without an influence on the shock absorber stroke of the rear shock absorber.

According to an embodiment of the present invention, the lowered arrangement position of the rear shock absorber can increase the arrangement flexibility of the rear shock absorber without sacrificing the storage chamber. This produces effects wherein the storage chamber can be increased in capacity without an influence on the shock absorber stroke of the rear shock absorber and that the hanging portion can realize the optimum arrangement of the rear shock absorber without being influenced by the shape of the frame or the like.

According to an embodiment of the present invention, since the rear shock absorber can ensure the long shock absorber stroke, there is an effect on enhancing the ride quality.

According to an embodiment of the present invention, since the entire body frame can share and carry, via the hanging portion, an input load applied to the rear shock absorber, there is an effect of increasing the support-rigidity of the body frame for the rear shock absorber.

According to an embodiment of the present invention, since the attachment portion of the rear shock absorber can be reinforced without sacrificing the storage capacity of the storage chamber, there is an effect wherein the storage chamber can ensure a large storage capacity.

According to an embodiment of the present invention, since the rear portion of the storage chamber can be enlarged, there is an effect of further increasing the storage capacity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will be described with reference to the drawings.

Figure 1:
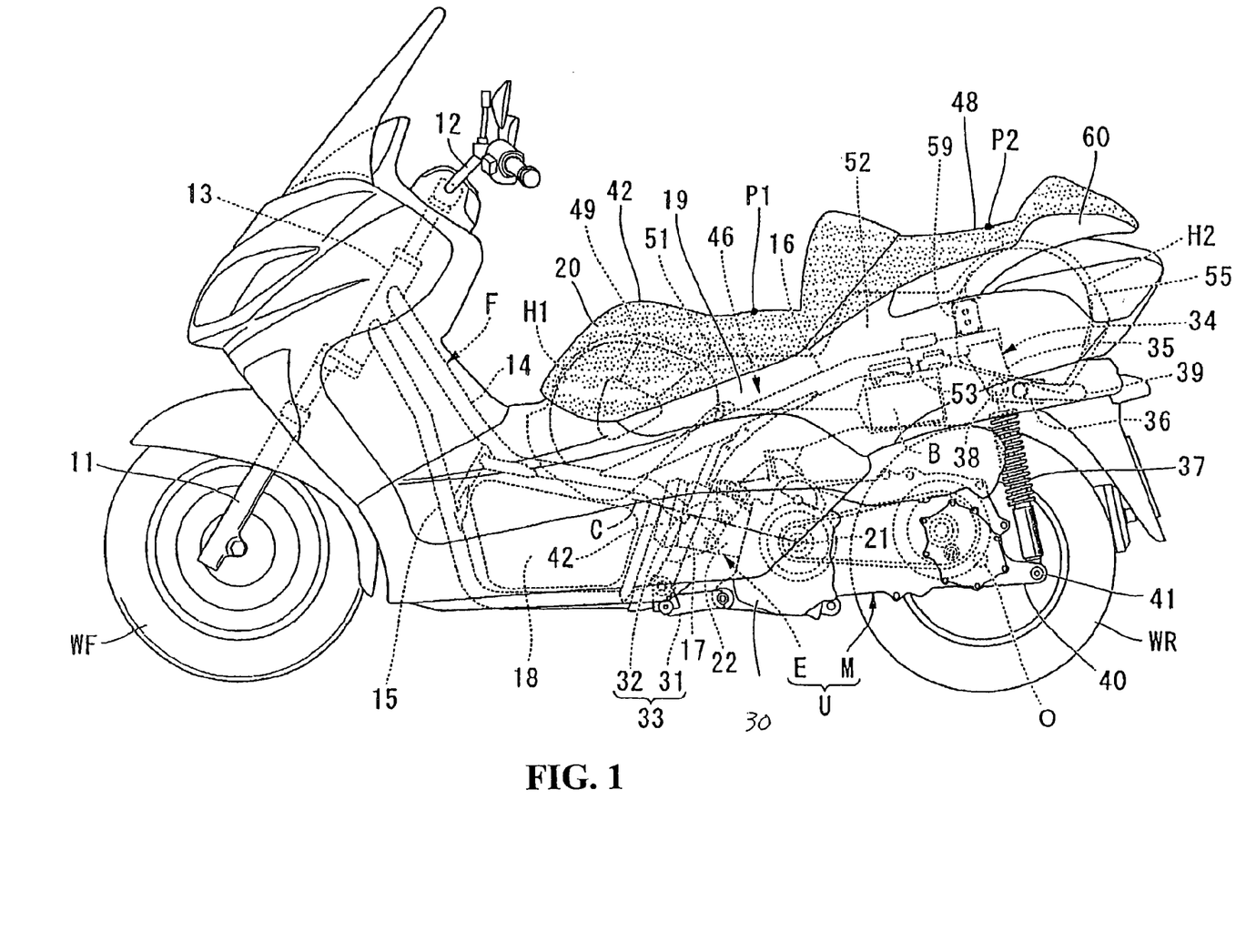
FIG. 1 is a side view of a scooter type motorcycle.

FIG. 1 illustrates a scooter type motorcycle that is a low floor type vehicle. A body frame F of the motorcycle is provided with a head pipe 13 at its front end. The head pipe 13 supports a front fork 11 that rotatably supports a front wheel WF and steerably supports steering handlebars 12 which are connected to the front fork 11. A unit swing type power unit U (swing member) is swingably supported by a longitudinally intermediate portion of the body frame F so as to rotatably support a rear wheel WR (wheel) as a driving wheel at its rear end.

The body frame F includes a pair of left and right upper down frames 14, 14 joined to the head pipe 13 and extending rearwardly and downwardly. A pair of left and right lower down frames 15, 15 are joined to the head pipe 13 and are disposed below the upper down frames 14, 14. In addition, the lower down frames 15, 15 are each bent such that its front portion extends rearwardly and downwardly and its rear portion extends substantially horizontally.

A pair of left and right seat rails 16, 16 are joined to the rear portions of the upper down frames 14, 14 and extend rearwardly and upwardly. A pair of left and right center frames 17, 17 are joined to the rear ends of the lower down frames 15, 15 and extend rearwardly and upwardly. The rear ends of the upper down frames 14, 14 are joined to the intermediate portions of the center frames 17, 17. The upper ends of the center frames 17, 17 are joined to the intermediate portions of the seat rails 16, 16.

A fuel tank 18 is mounted on the body frame F forward of the power unit U. A body cover 19 covers the fuel tank 18, the body frame F and part of the power unit U. A tandem type occupant seat 20 is disposed on the rear portion of the body cover 19 so as to be openable. The occupant seat 20 is designed to be vertically openable about a front hinge H. In addition, the occupant seat 20 may be designed to be laterally openable about a widthwise side portion of the seat.

The unit swing type power unit U includes a water-cooled four-cycle engine E and a belt type continuously variable transmission M. The engine E has a cylinder axle C which is tilted forwardly so as to be approximately horizontal and a crankshaft 21 as an output shaft which is parallel to a wheel-axle O of the rear wheel WR. The transmission M transmits the output of the engine E to the rear wheel WR. The rear wheel WR is rotatably supported by the rear portion of the power unit U at a position on the right side of the rear portion of the power unit U.

Figure 2:
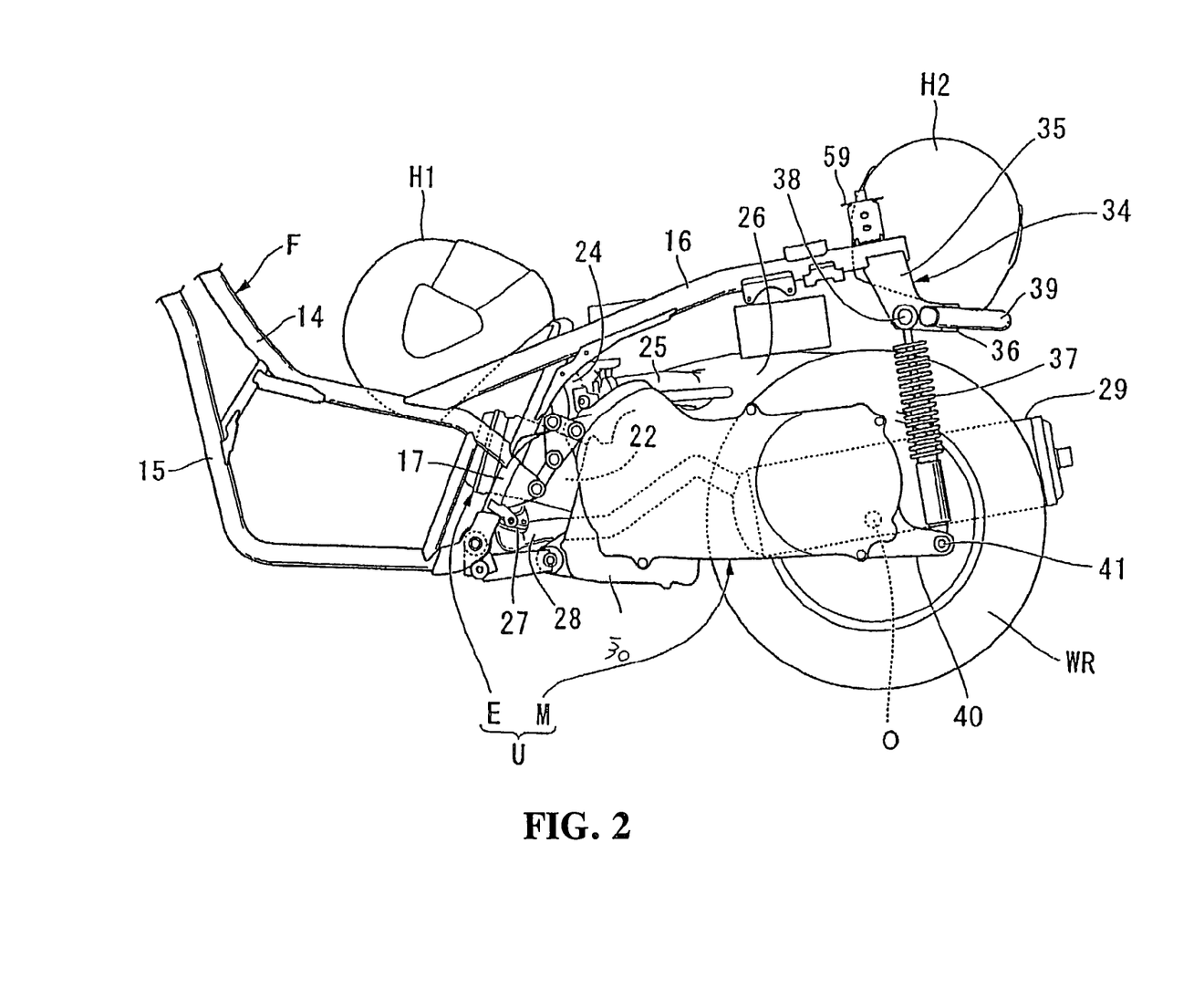
FIG. 2 is a side view illustrating the arrangement of major parts of a body rear portion with a storage portion omitted.
Figure 3:
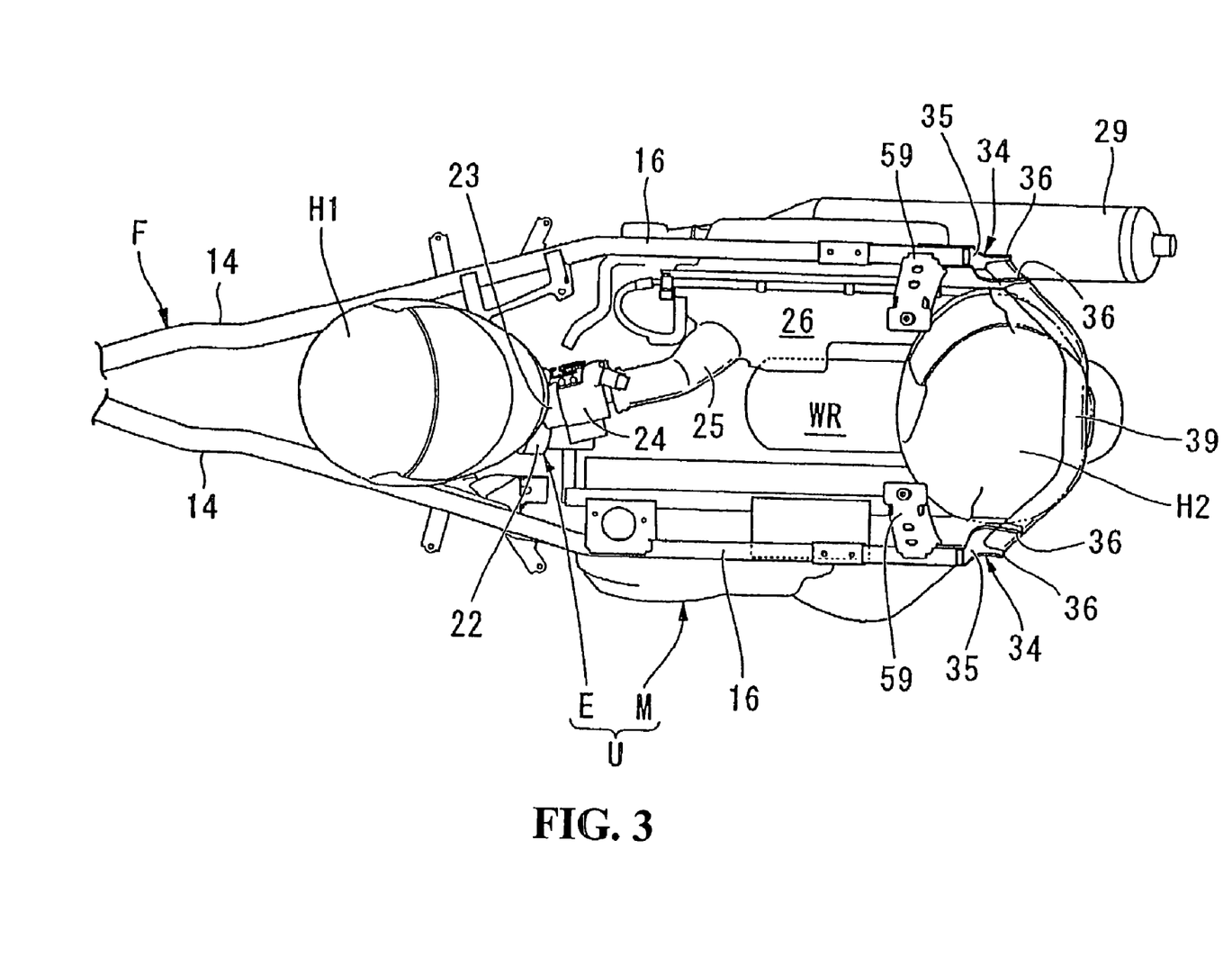
FIG. 3 is a plan view of FIG. 2.

Referring to FIGS. 2 and 3, the engine E includes a cylinder block 22 disposed at the front end thereof. A throttle body 24 is connected to an intake port 23 of the cylinder block 22. An air cleaner 26 is disposed below the seat rail 16 on the right side of the vehicle so as to be connected to the throttle body 24 through a connecting tube 25. An exhaust pipe 28 is connected to an exhaust port 27 of the cylinder block 22 and extends therefrom toward the rear and the right of the engine E. An exhaust muffler 29, disposed on the right side of the rear wheel WR, is connected to the rear end of the exhaust pipe 28.

As shown in FIG. 1, a crankcase 30 of the engine E constituting part of the power unit U is swingably supported by the body frame F via suspension means 33 including a first lower link mechanism 31 and a second upper link mechanism 32. The first link mechanism 31 is disposed between joints of the lower down frames 15, 15 and center frames 17, 17 of the body flame F and a front lower portion of the crankcase 30. The second link mechanism 32 is disposed between the intermediate portion of the center frame 17 of the body frame F and the front upper portion of the crankcase 30.

Referring to FIGS. 2 to 5, respective brackets 34 are attached from below to the rear ends of the seat rails 16 so as to extend downwardly. The bracket 34 includes a hanging portion 35 and a pair of fork portions 36. The hanging portion 35 extends obliquely downwardly and rearwardly as viewed from the side of the vehicle and obliquely inwardly as viewed from the rear of the vehicle (see FIG. 5). The fork portions 36 extend rearwardly from the hanging portion 35. The hanging portion 35 is provided at the lower end thereof with an upper end supporting portion 38 supporting the upper end of a rear shock absorber 37. In other words, the upper end supporting portion 38 is disposed below a storage chamber 46 described later and in the vicinity of the bottom portion of the storage chamber 46. As described above, the fork portions 36 are provided at lower ends of the left and right hanging portions 35. Both ends of a cross member 39 are gripped by and connected to the corresponding fork portions 36 so that the hanging portions 35 are connected by the cross member 39. The cross member 39 is made of a pipe and formed convex as viewed from above the vehicle, more specifically, in the shape of an approximately rearward convex trapezoidal.

Figure 6:
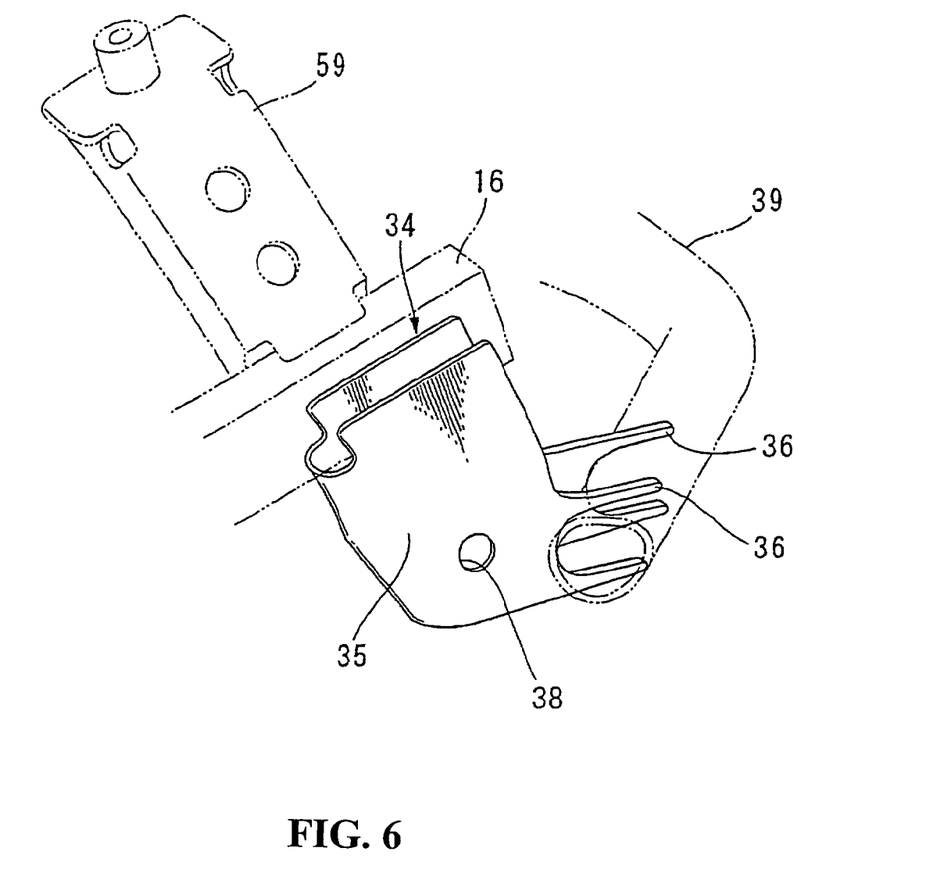
FIG. 6 is a perspective view of a left-hand bracket.

More specifically, referring to FIG. 6, the bracket 34 is formed by bending a plate into a cross-sectional U-shape so as to grip the seat rail 16 from both sides and is welded to the seat rail 16. The hanging portion 35 has an upper end joined to the seat rail 16 and a lower end which extends rearwardly to form the two fork portions 36. The end of the cross member 39 is gripped by the fork portions 36 and they are joined together by welding.

An upper bracket 59 is attached from above to a rear end of each seat rail 16. The upper bracket 59 is formed to extend circularly toward the inside. Both ends of a U-shaped grab rail 60 (see FIG. 1) are removably attached to the upper brackets 59.

On the other hand, the unit swing type power unit U is provided with a support bracket 40 which extends rearwardly of the wheel-axle O of the rear wheel WR toward a lower position. The support bracket 40 is provided at the end thereof with a lower end support portion 41 supporting the lower end of the rear shock absorber 37. The upper end of the rear shock absorber 37 is pivotally connected to the upper supporting portion 38 disposed at the lower end of the hanging portion 35 of the bracket 34 welded to the seat rail 16. Similarly, the lower end of the rear shock absorber 37 is pivotally connected to the lower end support portion 41 disposed at the end of the support bracket 40. The rear shock absorber 37 is interposed between the power unit U and the seat rail 16 constituting part of the body frame F, thus causing the body frame F to suspend the power unit U.

Figure 4:
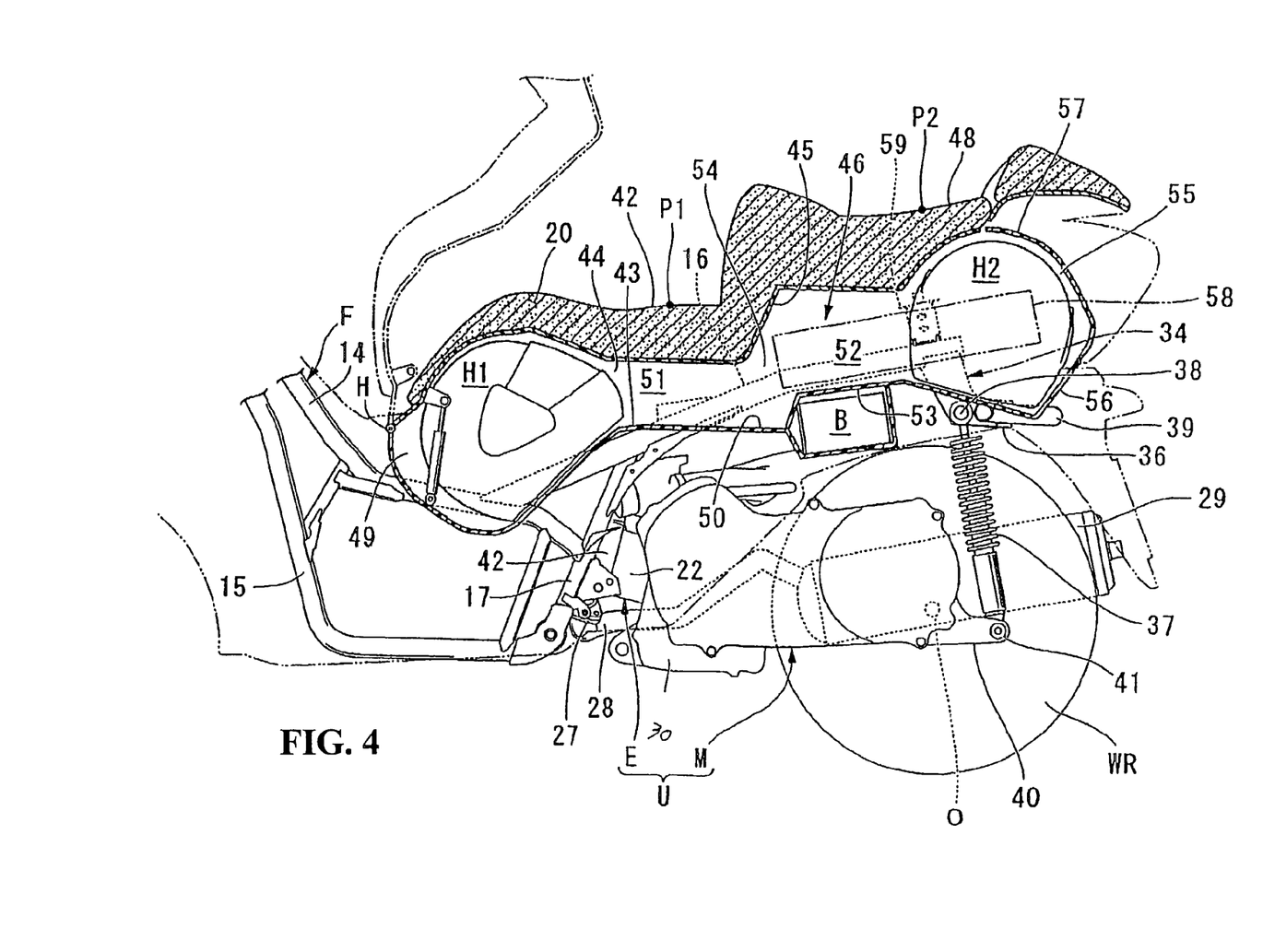
FIG. 4 is an explanatory side view of the body rear portion including the storage portion.
Figure 5:
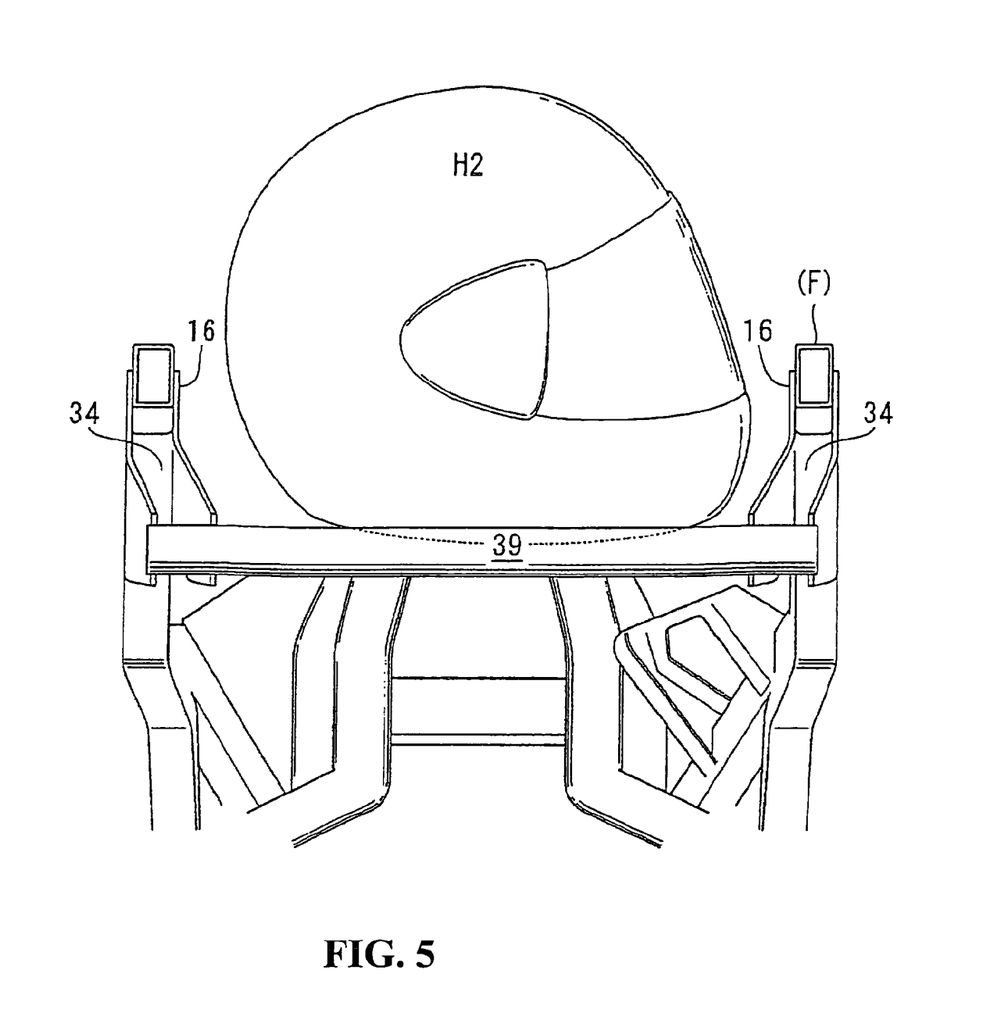
FIG. 5 is a partial rear view of the body frame.

A storage box 43, made of resin, is supported by supports not shown at a location extending from the front end of the seat rail 16, namely, a position forward of the cylinder head 42 of the engine E to the rear end of the seat rail 16, namely, a position rearward of the rear wheel WR. An upper opening 44 of the storage box 43 is configured to be openable and closable by the occupant seat 20 supported by the seat rails 16. The storage box 43 and the occupant seat 20, more specifically, a back plate 45 of the occupant seat 20, form a storage chamber 46. The occupant seat 20 includes a driver's seat 47 and a pillion 48 which are formed integrally. In addition, the storage box 43 may be made of metal.

The storage chamber 46 includes a first helmet chamber 49 that is located at the front portion thereof, that is, at a position in front of a rider's sitting point P1 so as to avoid the rider from sitting thereon, thereby applying no weight thereto. A bottom wall 50 of the first helmet storage chamber 49 is formed to tilt obliquely forwardly so that a first helmet H1 can be stored in the first helmet chamber 49, tilting obliquely forwardly, with its front portion or rear portion facing the forward. A front intermediate storage chamber 51 having the substantially flat bottom wall 50 is formed contiguously to the first helmet storage chamber 49. The rider's sitting point or the sitting point P1 of the rider's seat 47 is positioned above the front intermediate storage chamber 51.

The front intermediate storage chamber 51 is contiguous at the rear thereof to a rear intermediate storage chamber 52 via a bending portion 54 with the bottom wall 50 and the back plate 45 of the seat rail 16 formed to be cranked upwardly. A sitting point P2 of the pillion 48 is positioned above the rear portion of the rear intermediate chamber 52. A battery storage chamber 53 for storing a battery B therein is dividedly formed under the bottom wall 50 of the rear intermediate storage chamber 52 with the bottom wall 50 acting as an upper wall of the battery storage chamber 53. The battery storage chamber 53 reinforces the bending portion 54 formed between the front intermediate storage chamber 51 and the rear intermediate storage chamber 52. This ensures strength and rigidity of the storage box 43 constituting the lower portion of the storage chamber 46, and in turn ensures those of the entire storage chamber 46.

A second helmet storage chamber 55 (storage chamber) for storing a second helmet H2 therein is formed at a portion above the rear wheel WR and rearward of the rear intermediate storage chamber 52 and of the sitting point P2 of the pillion 48. The second helmet storage chamber 55 stores the second helmet H2 facing the side while the bottom wall 50 thereof extends obliquely downwardly toward the back.

The second helmet storage chamber 55 is disposed between the left and right seat rails 16, 16. The rear end of the bottom wall 50 is in front of the inner circumference of the cross member 39 as viewed from the side of the vehicle and terminates at a position corresponding to the vertically central portion of the cross member 39 as viewed from the side of the vehicle. The upper support portion 38 of the hanging portion 35 of the bracket 34 supporting the upper end of the rear shock absorber 37 is disposed in the vicinity of, more specifically, just below the bottom wall 50 of the second helmet storage chamber 55. In other words, the cross member 39 is located at the rear end and the bottom portion of the second helmet storage chamber 55 as viewed from the side of the vehicle.

The rear edge of the bottom wall 50 of the second helmet storage chamber 55 is contiguous with a rear wall 56 which rises obliquely rearwardly so as to extend along the inner circumference of the cross member 39. Then, the rear wall 56 merges into an upper wall 57. The upper wall 57 extends above the second helmet H2 and coincidently terminates at the rear end of the back plate 45 of the occupant seat 20.

It is to be noted that a relatively large attache case can be laid in the rear intermediate storage chamber 52 and the second helmet storage chamber 55 for storage instead of storing the second helmet H2 in the second helmet storage chamber 55.

According to the embodiment described above, the upper end support portion 38 supporting the upper end of the rear shock absorber 37 is located at the lower end of the hanging portion 35 of the bracket 34 which is attached to the seat rail 16 so as to extend therefrom obliquely rearwardly and downwardly. In addition, the lower end support portion 41 supporting the lower end of the rear shock absorber 37 is located at the end of the support bracket 40 which extends rearwardly of the wheel-axle O of the rear wheel WR and toward the lower position. Thus, the rear shock absorber 37 can be arranged at a lower position. The storage chamber 46 provided under the occupant seat 20 can be expanded toward the underside according to the lower position of the rear shock absorber 37 to ensure a large capacity. It is possible to increase the arrangement flexibility of the rear shock absorber 37 without sacrificing the storage chamber 46 under the occupant seat 20. As a result, the storage chamber 46 can be increased in capacity without an influence on the shock absorber stroke of the rear shock absorber 37.

Since the raising force is applied from the rear shock absorber 37 to the hanging portion 35 of the bracket 34 in the longitudinal direction thereof, which is advantageous in terms of strength, it is preferable in view of supporting rigidity.

The upper end supporting portion 38 adapted to attach the upper end of the rear shock absorber 37 thereto is provided at the lower end of the hanging portion 35 of the bracket 34 attached to the seat rail 16. Therefore, the hanging portion 35 can realize the optimum arrangement of the rear shock absorber 37 without an influence of the shape or the like of the seat rail 16. Also this configuration can flexibly deal with various types of vehicles.

The unit swing type power unit U is formed with the support bracket 40 which is located at a position rearward of the wheel-axle O of the rear wheel WR and extends toward a lower position. In addition, the lower end support portion 41, adapted to support the lower end of the rear shock absorber 37, is located at the end of the support bracket 40. Therefore, the elongated shock absorber stroke of the rear shock absorber 37 can be ensured according to the lower arrangement of the lower end support portion 41. Thus, the ride quality is enhanced.

The pair of fork portions 36 are provided which extend rearwardly from the hanging portion 35 of the bracket 34 secured to the seat rail 16. In addition, both the ends of the cross member 39, made of a pipe and formed convex as viewed from above the vehicle, are formed in the shaped of an approximately rearward convex trapezoidal and are gripped by and connected to the fork portions 36 so that the hanging portions 35 are connected by the cross member 39. Thus, the entire body frame F can share and carry, via the hanging portion 35, an input load applied from the rear shock absorber 37 to the upper end support portion 38 which is disposed at the upper end of the rear shock absorber 37 and at the lower end of the hanging portion 35. This can enhance the support-rigidity of the seat rail 16 for the rear shock absorber 37.

The cross member 39 is located at the rear end and bottom of the second helmet storage chamber 55 as viewed from the side of the vehicle. Therefore, the second helmet storage chamber 55 can ensure a sufficiently broad storage capacity and in turn the attachment portion of the rear shock absorber 37 can be reinforced without sacrificing the storage capacity. In particular, the cross member 39 is formed in the shape of a rearward convex as viewed from above the vehicle, more specifically, in the shape of approximately a rearward convex trapezoidal. Therefore, the rear portion of the second helmet storage chamber 55 can be enlarged, thereby further increasing the storage capacity of the second helmet storage chamber 55.

The hanging portion 35 of the bracket 34 extends obliquely downwardly and rearwardly as viewed from the side of the vehicle and obliquely inwardly as viewed from the rear of the vehicle. Therefore, the second helmet storage chamber 55 can ensure the increased width thereof and the widthwise attachment span between the rear shock absorbers 37 can be reduced. This can ensure the increased space for arranging the exhaust system including the exhaust pipe 29.

Since the cross member 39 can be disposed rearward of the wheel-axle O of the rear wheel WR, the pillion 48 can be reduced in height as compared with a case where the cross member 39 is disposed above the wheel-axle O of the rear wheel WR.

The cross member 39 is gripped by and connected to the fork portions 36 provided at the lower end of the hanging portion 35 of the bracket 34. Therefore, the cross member 39 can function as a member for accommodating back-and-forth or up-and-down variations of the left and right seat rails 16. This can increase productivity. More specifically, even if the rear end positions of the left and right seat rails 16, 16 slightly deviate back-and-forth and/or up-and-down, the adjustment of attachment position of the cross member 39 can accommodate the back-and-forth deviations, thereby allowing the cross member 39 to adjust the height positions of the left and right seat rails.

It should be noted that the present invention is not limited to this embodiment. For instance, the cross member 39 may be formed in an arcuate shape, not limited to almost-trapezoidal, as long as it is formed in the shape to be rearward concave.

In this embodiment, the engine E is of a structure swinging with the belt type continuously variable transmission M. However, the present invention may be applicable to a motorcycle configured such that the engine E is supported by the body frame F and the belt type continuously variable transmission M swings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear shock absorber arrangement structure for a motorcycle, comprising:
    a swing member swingably connected to a body frame and rotatably supporting a wheel;
    a rear shock absorber adapted to cause the body frame to suspend the swing member; and
    a storage chamber disposed above the wheel;
    wherein a lower end of the rear shock absorber is brought connected at a position lower than a wheel-axle provided in the swing member as viewed from a side of the motorcycle, and an upper end of the rear shock absorber is connected to a portion lower than the storage chamber and near a bottom portion of the storage chamber,
    wherein the body frame includes a pair of left and right frames, for supporting the storage chamber, the hanging portion is attached to each of the left and right frames, and the hanging portions are connected by a cross member,
    wherein the cross member is located at a position corresponding to a rear end portion and a bottom portion of the storage chamber as viewed from the side of the motorcycle, and
    wherein the cross member is formed in a shape of a rearward concave as viewed from above the motorcycle and a rear surface of the storage chamber is formed to extend along the cross member.

2. A rear shock absorber arrangement structure for a motorcycle, comprising:
    a swing member swingably connected to a body frame and rotatably supporting a wheel;
    a rear shock absorber adapted to cause the body frame to suspend the swing member; and
    a storage chamber disposed above the wheel;
    wherein a hanging portion is attached to a portion that is part of the body frame and supports the storage chamber, the hanging portion being formed to extend downwardly and terminate at least near a bottom portion of the storage chamber, and an upper end of the rear shock absorber is connected to the hanging portion at a position below the storage chamber,
    wherein the body frame includes a pair of left and right frames, and the hanging portion includes a pair of left and right hanging portions attached respectively to the left and right sides of the body frame, and
    further comprising a cross member extending between lower rear ends of the left and right hanging portions.

3. The rear shock absorber arrangement structure for a motorcycle according to claim 2, wherein a lower end of the rear shock absorber is connected to a portion of the swing member at a position rearward and downward of a wheel axle.

4. The rear shock absorber arrangement structure for a motorcycle according to claim 2, wherein the body frame includes a pair of left and right seat rails, and the left and right hanging portions extend downwardly by equal distances from each of the left and right seat rails.

5. The rear shock absorber arrangement structure for a motorcycle according to claim 4, wherein the cross member is located at a position corresponding to a rear end portion and a bottom portion of the storage chamber as viewed from a side of the motorcycle.

6. The rear shock absorber arrangement structure for a motorcycle according to claim 5, wherein the cross member is formed in a shape of a rearward concave as viewed from above the motorcycle and a rear surface of the storage chamber is formed to extend along the cross member.

7. The rear shock absorber arrangement structure for a motorcycle according to claim 6, wherein the cross member is formed in a shape of a rearward convex trapezoidal.

8. The rear shock absorber arrangement structure for a motorcycle according to claim 2, further comprising left and right fork portions extending rearwardly from each of the left and right hanging portions,
wherein the left and right fork portions are connected by the cross member.

9. The rear shock absorber arrangement structure for a motorcycle according to claim 8, wherein the cross member is located at a position corresponding to a rear end portion and a bottom portion of the storage chamber as viewed from a side of the motorcycle.

10. The rear shock absorber arrangement structure for a motorcycle according to claim 9, wherein the cross member is formed in a shape of a rearward concave as viewed from above the motorcycle and a rear surface of the storage chamber is formed to extend along the cross member.

11. A rear shock absorber arrangement structure for a motorcycle, comprising:
a swing member swingably connected to a body frame for rotatably supporting a rear wheel at a distal end thereof;
a rear shock absorber adapted to cause the body frame to suspend the swing member;
a storage chamber disposed above the rear wheel;
a hanging portion attached to a rear portion of the body frame for supporting the storage chamber, the hanging portion being formed to extend downwardly and terminate at least near a bottom portion of the storage chamber;
a distal end of the rear shock absorber being operatively connected to the hanging portion at a position below the storage chamber; and
a proximal end of the rear shock absorber being operatively connected to the distal end of the swing member for supporting the hanging portion at a rearward position relative to a wheel axle for the rear wheel,
wherein the body frame includes a pair of left and right frames, and the hanging portion includes a pair of left and right hanging portions attached respectively to the left and right sides of the body frame, and further comprising a cross member extending between lower rear ends of the left and right hanging portions.

12. The rear shock absorber arrangement structure for a motorcycle according to claim 11, wherein the proximal end of the rear shock absorber is connected to the distal end of the swing member at a position rearward and downward of the wheel axle.

13. The rear shock absorber arrangement structure for a motorcycle according to claim 12, wherein the body frame includes a pair of left and right seat rails, and the left and right hanging portions extend downwardly by equal distances from each of the left and right seat rails.

14. The rear shock absorber arrangement structure for a motorcycle according to claim 13, wherein the cross member is located at a position corresponding to a rear end portion and a bottom portion of the storage chamber as viewed from a side of the motorcycle.

15. The rear shock absorber arrangement structure for a motorcycle according to claim 14, wherein the cross member is formed in a shape of a rearward concave as viewed from above the motorcycle and a rear surface of the storage chamber is formed to extend along the cross member.

16. The rear shock absorber arrangement structure for a motorcycle according to claim 15, wherein the cross member is formed in a shape of a rearward convex trapezoidal.

17. The rear shock absorber arrangement structure for a motorcycle according to claim 11, further comprising left and right fork portions extending rearwardly from each of the left and right the hanging portions,
wherein the left and right fork portions are connected by the cross member.

18. The rear shock absorber arrangement structure for a motorcycle according to claim 17, wherein the cross member is located at a position corresponding to a rear end portion and a bottom portion of the storage chamber as viewed from a side of the motorcycle.

19. The rear shock absorber arrangement structure for a motorcycle according to claim 18, wherein the cross member is formed in a shape of a rearward concave as viewed from above the motorcycle and a rear surface of the storage chamber is formed to extend along the cross member.

20. The rear shock absorber arrangement structure for a motorcycle according to claim 19, wherein the cross member is formed in a shape of a rearward convex trapezoidal.

* * * * *